May 11, 1943.　　　H. I. JOHNSON　　　2,318,865
PITCH GAUGE AND MILLING CUTTER FOR PROPELLERS
Filed Oct. 12, 1940　　　3 Sheets-Sheet 2
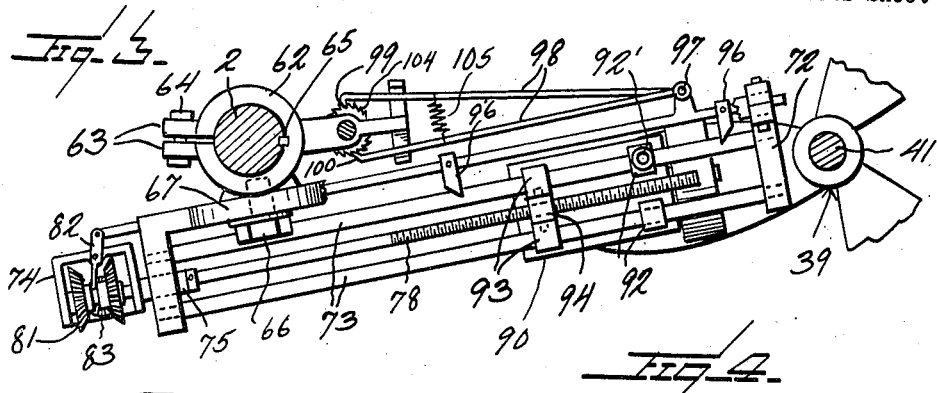
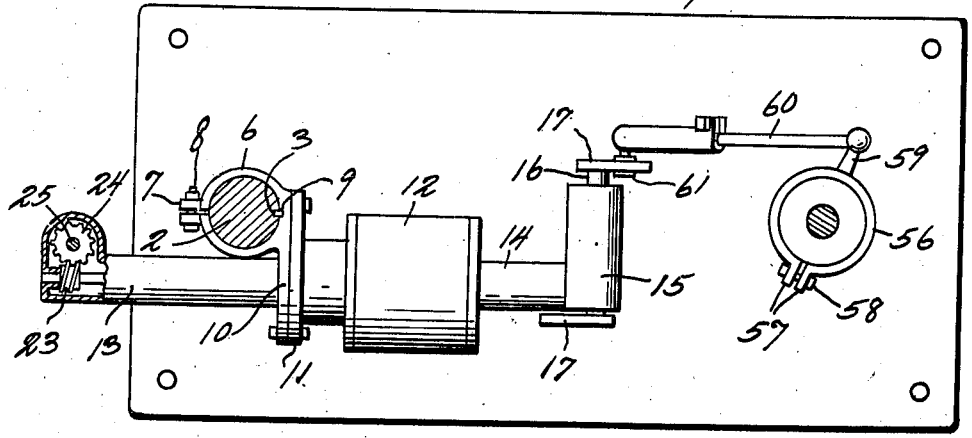
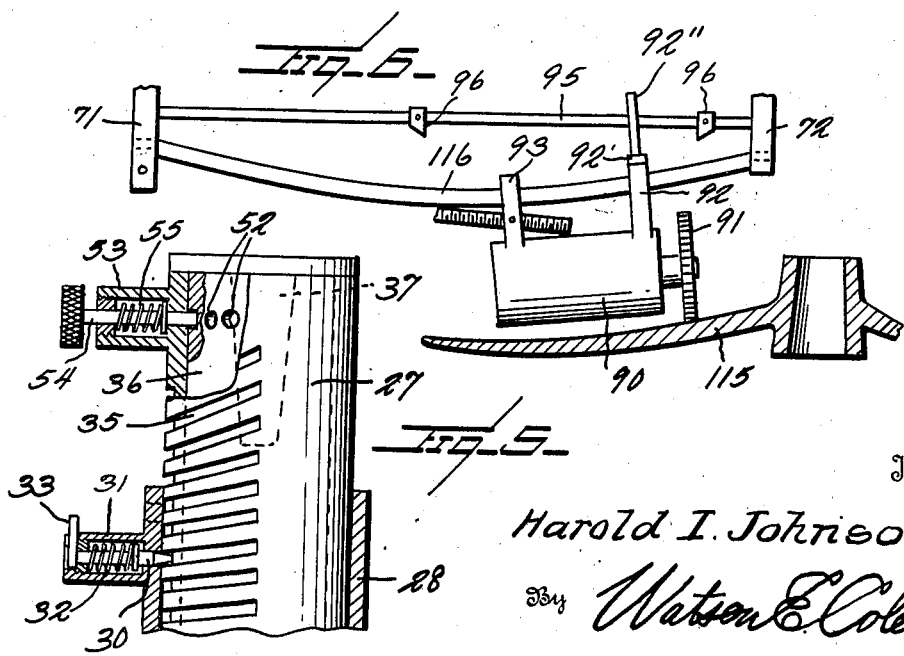
Inventor
Harold I. Johnson
By Watson E. Coleman
Attorney May 11, 1943. H. I. JOHNSON 2,318,865
PITCH GAUGE AND MILLING CUTTER FOR PROPELLERS
Filed Oct. 12, 1940 3 Sheets-Sheet 3
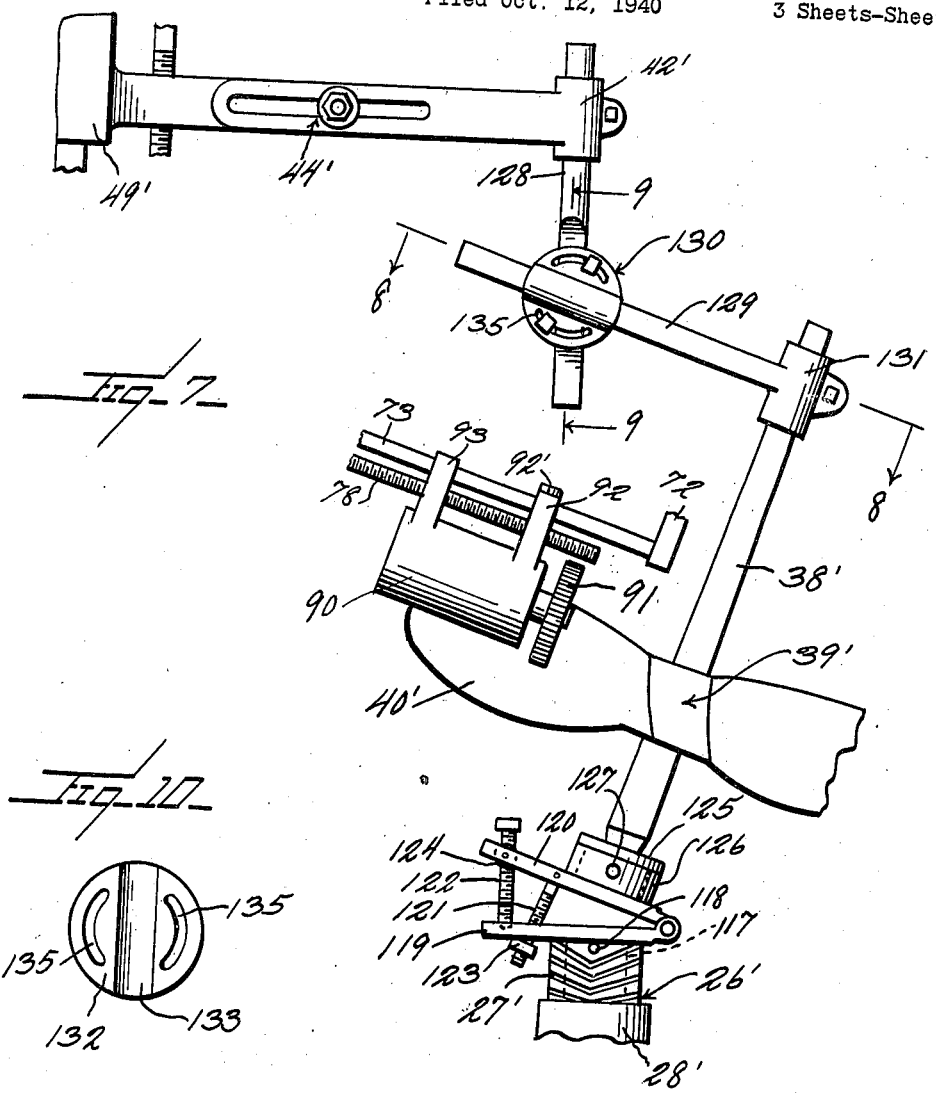
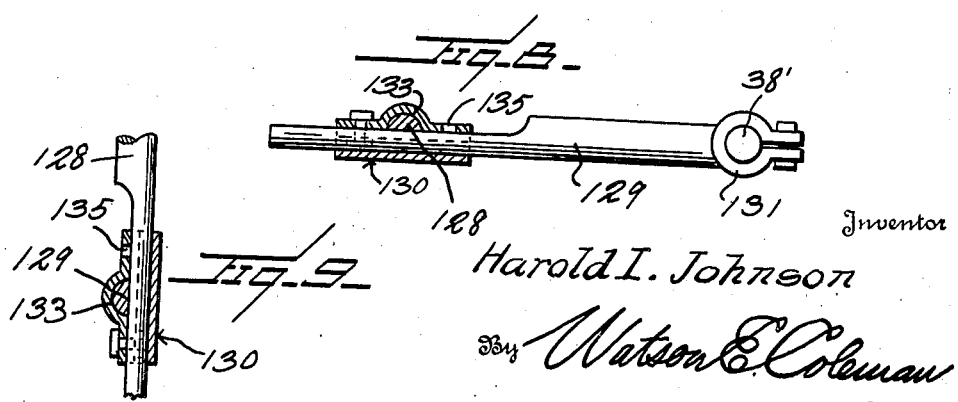
Inventor
Harold I. Johnson
By Watson E. Coleman
Attorney Patented May 11, 1943

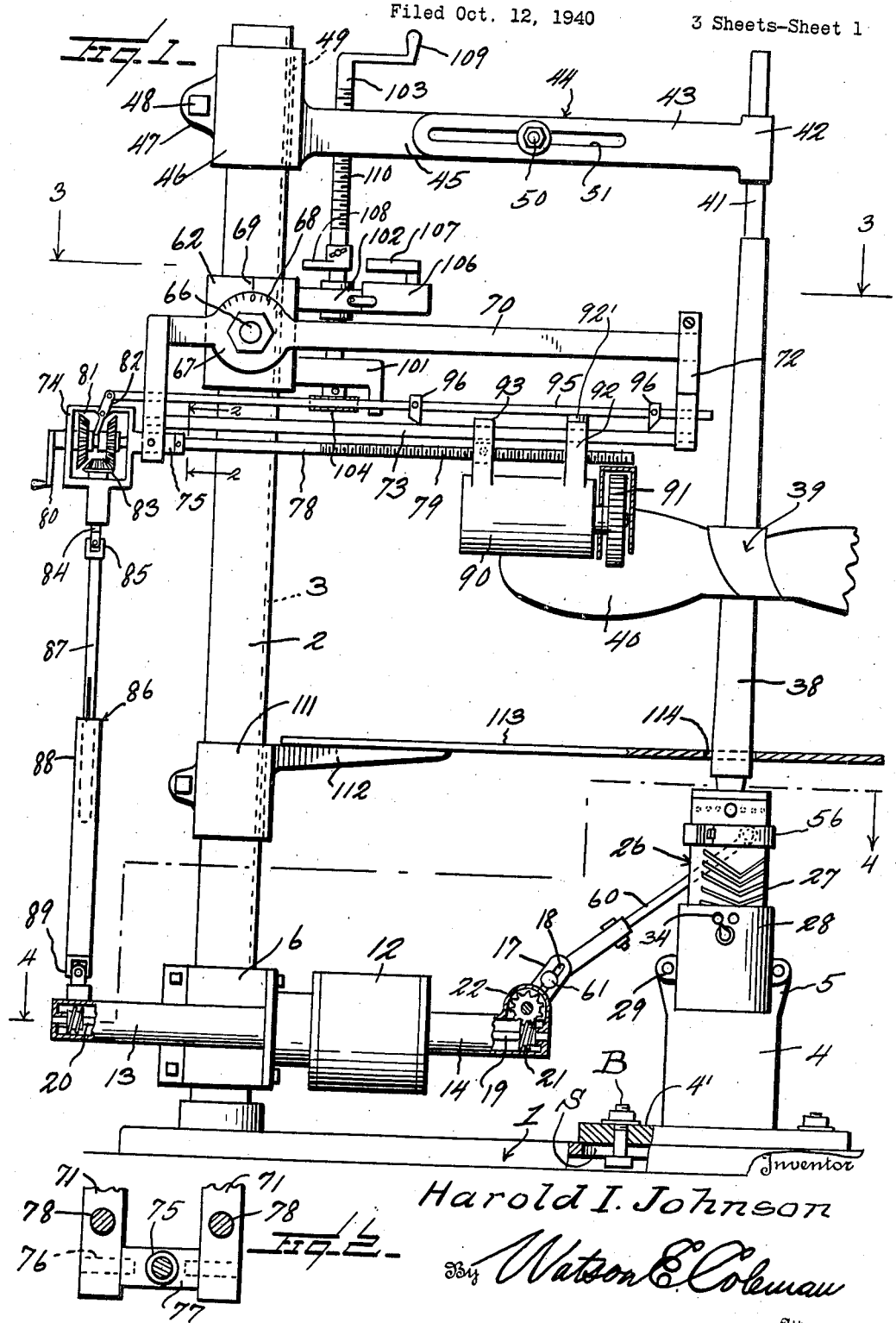

2,318,865

UNITED STATES PATENT OFFICE 2,318,865

PITCH GAUGE AND MILLING CUTTER FOR PROPELLERS

Harold I. Johnson, Newport Beach, Calif.

Application October 12, 1940, Serial No. 361,002

26 Claims. (Cl. 90—14)

This invention relates to the class of milling and grinding machines and pertains particularly to improvements in machines for finishing propellers.

A primary object of the present invention is to provide a propeller grinding and milling machine having a novel pitch head unit associated therewith whereby necessary adjustments may be made for properly milling a propeller to the desired pitch without necessitating the changing of any gears in the making of the pitch selection.

Another object of the invention is to provide a propeller blade grinding and milling machine employing a gearless pitch head by means of which the changing of the machine for operation upon propellers of different pitches may be accomplished easily and without requiring the interchanging of operating parts.

Still another object of the invention is to provide a propeller grinding and milling machine wherein the milling cutter is automatically fed or moved back and forth over the face of a blade and is automatically stopped after the blade has been milled to the desired extent.

A still further object of the invention is to provide a machine of the character set forth in which a novel coupling is maintained between the pitch head with which the propeller is connected and the milling machine whereby the propeller is given a desired degree of rotation on its axis and a desired degree of movement along a path perpendicular to the axis of rotation simultaneously with the movement of a milling cutter longitudinally of a blade of the propeller.

Still another object is to provide a propeller grinding and milling machine by which both sides or faces of the propeller blade can be machined and by means of which there may be accomplished the machining or working of blades which are not of true screw type or true pitch.

The invention will be best understood from a consideration of the following detailed description taken in connection with the drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in elevation of the grinding and milling machine embodying the present invention, showing a propeller mounted thereon.

Fig. 2 is a fragmentary section taken on the line 2—2 of Fig. 1.

Fig. 3 is a sectional view on the line 3—3 of Fig. 1.

Fig. 4 is a sectional view on the line 4—4 of Fig. 1.

Fig. 5 is a detailed view partly in section and partly in elevation of the upper portion of the pitch head.

Fig. 6 illustrates a modification of the suspension means for the milling cutter operating motor to be used when milling or finishing a longitudinally curved blade.

Fig. 7 illustrates a modification of the pitch head unit and arbor bracing means for use in the milling of propellers which are not of true pitch.

Fig. 8 is a sectional view on the line 8—8 of Fig. 7.

Fig. 9 is a sectional view on the line 9—9 of Fig. 7.

Fig. 10 is a detailed view of one of the clamping plates shown in Fig. 7.

Referring now more particularly to the drawings, the numeral 1 generally designates the base of the present machine to which is fixed the vertical standard or post 2, which is provided throughout its length with a key slot 3. Spaced from the post 2 is a pitch head supporting pedestal 4 which has a bottom plate 4' which rests upon the base 1 and is adjustable thereon relatively to the post 2 and secured in adjusted position by bolts B which extend through a guide slot S. This pedestal is tubular for the reception of a portion of the pitch head hereinafter described and upon its upper end it carries the oppositely disposed ears between and to which an element of the pitch head is secured.

Encircling the lower part of the post 2 is a split collar 6, the ears 7 of which are drawn together by a bolt 8. This collar is maintained against rotation on the post, but is permitted longitudinal movement thereon, by a key 9, which engages in the keyway 3 and in a corresponding key slot in the collar.

Integrally formed with the collar 6 is a vertical bracket plate 10 which extends substantially tangentially to the post and to this plate is secured the mounting plate 11 which forms a part of the housing for an electric motor 12.

The housing for the electric motor 12 includes a tubular shaft housing 13 extending from the plate 11 through the bracket plate 10, and a second oppositely directed tubular housing 14 which at its free end is formed to provide the transverse housing 15 through which extends a crank shaft 16. Upon each end of the crank shaft is a crank 17 which is provided with a longitudinally extending slot 18. The armature of the motor 12 is connected with the drive shafts 19 and 20, which extend respectively through the housings 14 and 13, as shown in Fig. 1. The shaft 19 is connected by the worm 21 with a worm pinion 22, which is mounted upon the crank shaft 16 within the transverse housing 15. The shaft 20 also carries upon its outer end the worm 23 which connects with the worm pinion 24 supported upon the vertical stub shaft 25, which is rotatably supported by the outer end of the housing 13 in a suitable laterally extending encasing portion, as shown in Fig. 4.

The pitch head unit which is supported upon the pedestal 4 is indicated as a whole by the numeral 26. This unit comprises the pitch head cylinder 27 which extends through a relatively wide collar 28 which is secured by the ears 29 to the ears 5 of the pedestal so that it is held firmly in position on the pedestal coaxially therewith. This collar carries a pitch selector pin 30 which, as shown in Fig. 5, is mounted in a suitable radially extending guide 31 and is normally urged by the expansion spring 32 in the guide inwardly toward the pitch cylinder 27. A head 33 formed upon the outer end of the pitch selector pin 30 facilitates retraction of the pin and also functions as an indicator finger which cooperates with sight openings or apertures 34 which are formed through the collar 28 for the purpose of viewing the number identifying the pitch groove of the cylinder 27 in which the selector pin is engaged.

The pitch cylinder 27 is provided with a plurality of pairs of obliquely directed pitch grooves or slots which are indicated by the numeral 35. The two grooves or slots of each pair are directed oppositely so that as is shown in Fig. 1, each pair forms a V in the cylinder and the angles of the pairs vary or change progressively from one end of the cylinder toward the other. These grooves represent fixed propeller pitches, one groove of each pair functioning in the operation of the machine for turning a propeller blade for right-hand pitch while the other groove functions to turn the blade for a left-hand pitch. Above each pair of pitch grooves the pitch of the underlying groove is marked and this pitch marking is observed through one of the sight openings 34 toward which opening the pointed end of the selector pin head is directed when the point of the pin is engaged in the groove shown.

Within the pitch groove cylinder 27 is rotatably mounted a divider head 36 which, as shown in Fig. 5, is in the form of a solid body of circular cross-section having formed in its upper end a tapered socket 37 in which is fitted the lower tapered end of the arbor 38 on which the propeller, which is to be milled, is mounted. This arbor tapers from its lower to its upper end, as shown, so that it will receive in various positions thereon propellers having axial shaft openings of different diameters. The propeller shown in Fig. 1, mounted upon the arbor 38, is indicated generally by the numeral 39, one blade 40 being in position for milling by the hereinafter described mechanism.

The upper end of the arbor 38 is reduced slightly as indicated at 41, to receive the collar 42 which is formed at one end of the part 43 of a two-part brace arm, which is indicated generally by the numeral 44. The other part of this brace arm is indicated at 45 and is integrally connected with the split collar 46 which encircles the upper end of the post 2 and has the ends or ears 47 thereof drawn together by a bolt 48 to cause it to firmly grip the post to maintain a set position thereon. This collar is provided with a suitable key 49 for engagement in the keyway 3, thus preventing the collar from turning on the post but permitting the axial movement. The two portions of the arm 44 are adjustably connected together by the bolt 50, one of the portions, here shown as the portion 43, being longitudinally slotted as at 51, to permit lengthening or shortening of the arm.

The divider head 36 which is rotatably positioned within the pitch groove cylinder 27, is provided with a number of notches 52 around its upper end, these notches being equi-distantly spaced and being spaced to correspond with the spacing of the blades of propellers having three, four or any other number of such blades.

The pitch groove cylinder 27 carries a radially directed guide 53 through which extends the reciprocable spacing selector pin 54. This pin is normally urged to move inwardly toward the divider head 36 by the expansion spring 55 which encircles the pin 54, as shown in Fig. 5, thus causing the pin to move into one of the notches 52. In this manner, when a propeller is mounted upon the arbor 38 and has been turned with the arbor and the divider head 36, the pin 54 being retracted, to the position where the blade is disposed in the right position to be operated upon by the milling cutter, the pin 54 when released will enter one of the notches 52 and hold the divider head, arbor and propeller against further turning.

Secured about the upper end of the pitch groove cylinder 27 is a split collar 56, the ears 57 of which are drawn together by the bolt 58 to maintain the collar in adjusted position upon the cylinder. This collar carries a ball-headed arm 59 which is engaged by one socketed end of a two-part extensible connecting link 60. The other end of this connecting link which is also socketed, is coupled with a ball-headed pin 61, which is adjustably secured in the slot 18 of a crank arm 17. Thus it will be seen that upon operation of the motor 12, the crank arm 17 with which the link 60 is connected will be rotated or turned and will cause oscillation of the grooved pitch cylinder 27. Since this cylinder is supported in position in the collar 28 by the pitch selector pin 30 which is in engagement in one of the pitch grooves, it will be seen that as the cylinder 27 is turned on its vertical or long axis, it will also move axially due to the sloping of the groove in which the selector pin is engaged. Consequently the propeller blade 40 will be swung through a portion of an arc and will at the same time be raised and lowered during such swinging.

The numeral 62 designates a split collar which encircles the post 2 and has the ears 63 thereof drawn together to tighten the collar around the post by the bolt 64. A key 65 carried by this collar engages in the keyway 3 of the post to prevent the collar from turning. This collar has secured thereto by the radially directed stud bolt 66, the plate 67, the upper edge of which is laid off in the form of a protractor to designate degrees of a circle as indicated at 68. These degree markings coact with a center marking 69 upon the split collar to facilitate adjusting the plate 67 so that the horizontal arm 70 of which the plate forms an integral part may be placed perfectly horizontal or perpendicularly to the post 2 or at a desired angle to the post. This arm 70 at one end, preferably the end nearest to the collar 62, carries the depending legs 71, Fig. 2, which are disposed in side by side relation in a plane extending transversely of the arm. At the opposite or remote end of the arm 70 from the legs 71, the arm has removably secured thereto the plate 72. This plate and the legs 71 are disposed upon the side of the arm 70 away from the post 2, so that the units carried between the legs and the plate 72 may extend across and be free from contact with the post.

Extending longitudinally of the arm 70 in spaced parallel relation and at an elevation below the arm are two guide bars 73 which are each detachably connected at one end with a leg 71 of the supporting arm 70 and at the other end with the plate 72.

At the end of the arm 70 from which the legs 71 extend, there is disposed a gear housing or box 74 which is provided at one side with a shaft sleeve 75 which passes between the arms 71 below the guides 73 and is pivotatlly attached to the arms by the pivot pins 76, which are shown in Fig. 2 as extending through the arms into the ends of a cross-head 77 which forms an integral part of the shaft sleeve 75. Extending through the shaft sleeve 75 and into the gear housing or box 74 is a horizontal shaft 78. The major portion of this shaft extends from the arms 71 toward the plate 72 and is screw threaded, as indicated at 79. As shown in Fig. 1, a portion of the outer end of the shaft 78 passes through the gear box and carries upon the opposite side of the box from the sleeve 75, a hand crank 80. Within the gear box the shaft supports and has splined thereto the connected oppositely directed or opposed miter gears 81 with which is connected a shifting fork 82 which is pivotally mounted upon the gear box, as shown, and extends above the top of the box.

Within the gear box and disposed between the miter gears is a miter pinion 83, which has a stem 84 extending downwardly through a suitable guide forming a part of the box and this stem is connected by the universal joint coupling 85 with an extensible shaft, which is indicated as a whole by the numeral 86 and which comprises the two portions 87 and 88, which are slidably joined together so that they may be relatively moved lengthwise but are held against relative turning. At the lower end of this shaft 86 is a universal coupling 89 which connects the shaft with the shaft 25 on which is carried the worm wheel 24 which is operatively coupled with the shaft 20 of the driving motor 12.

The numeral 90 designates an electric motor with the armature shaft of which is connected a cutting or dressing wheel 91. This motor is reciprocated lengthwise of the arm 70 and is supported for such movement by the guides 73 in the following manner. The motor is provided with a forward pair of supporting legs 92 through which the guide bars 73 pass and with a second or rear pair of supporting legs 93 which are also apertured to have the guide bars 73 pass therethrough. In this manner the motor is suspended from the guide bars. The legs 93 have pivotally supported therebetween a nut 94 through which the threaded portion of the shaft 78 passes, so that rotation of the shaft 78 will effect the movement of the motor lengthwise of the shaft and of the guides 73. Since the motor supporting mechanism is carried upon the post 2, so that the axis of the shaft 78 and the axis of the dressing or grinding wheel 91 passes through the axial center of the propeller supporting arbor 38, it will be apparent that the cutting wheel can be moved lengthwise of or along the center line of a blade of the propeller.

The leg 92 near the forward or cutting wheel carrying end of the motor and nearest the supporting arm 70, is provided with a socket 92' in its end for the reception of an extension arm as hereinafter described.

Extending lengthwise of the guide bars 73 is a shift bar 95, one end of which is slidably supported by the plate 72 while the other end is pivotally attached to the upper end of the shifting fork 82, which is operatively coupled with the miter gears 81. This shift bar carries two adjustable stops 96 between which the legs of the dressing wheel motor 90 move. These stops are spaced apart so that when the dressing wheel moves toward the hub of the propeller to the desired extent, one of the forward legs will strike the nearest stop 96 and move the shift bar so as to change the gears in the gear box to effect the reverse rotation of the shaft 78. The motor and the dressing wheel will then move outwardly along the propeller blade until one of the legs 93 strikes the other stop 96 and this will throw the gears back into their former positions so as to again reverse the direction of rotation of the shaft and again move the dressing wheel toward the hub of the propeller.

In order that the machine may be stopped automatically after a desired number of movements of the dressing wheel have been made over a propeller blade, there is provided a stop mechanism which is particularly illustrated in Figs. 1 and 3. Upon reference to Fig. 3, it will be noted that the shift bar has pivotally attached thereto at 97, the two pawls 98. One of these pawls is provided with a reversely bent or directed point or hook 99 while the other one is provided with a forwardly and tangentially directed point 100. These pawls are directed toward the collar 62 to which the arm 70 is secured and there is joined to this collar the vertically spaced pair of arms 101 and 102 through which extend the lower end of a vertically disposed crank shaft 103. Upon the lower end of this crank shaft is a ratchet wheel 104, which is disposed between the pointed ends of the pawls 98. The pawls are coupled together by a spring 105 so that they are constantly resiliently urged into engagement with the ratchet wheel which on one side has its teeth engaged by the reversely bent point 99 and upon its other side has its teeth engaged by the forwardly extending point 100. Thus it will be seen that upon movement of the shift bar in one direction, as for example, away from the arbor 38, the point 100 will rotate the ratchet wheel clockwise and upon movement of the shift bar in the opposite direction, the point 99 will rotate the ratchet wheel in the same clockwise direction.

Mounted adjacent to the shaft 103 is a control switch 106 which is suitably connected with the motors 12 and 90, to turn on or off the electric current flowing to these motors. This switch is provided with a control arm or finger 107 which, when shifted in one direction in a horizontal plane above the body of the switch, will turn off or on the current flowing to the motors 12 and 90. The shaft 103 has secured thereto for adjustment therearound, a cam arm 108 which is located in the same plane as the switch button 107, so that when this arm is swung around in one direction, it will engage the switch button to open the switch for the purpose of shutting off the flow of current to the motors. This movement of the cam is effected by the pawl and ratchet mechanism which is actuated by the motor 90 in its back and forth movement, and thus it will be seen that the cam 108 may be set in a position so that it will have to swing through nearly a complete circle to engage the switch button or it may be set to swing through a portion of the circle only and thus in this way the length of time which the milling cutter will be permitted to move back and forth over the propeller blade before the current to the motor is shut off, can be readily controlled.

The shaft 103 carries a crank 109 upon its upper end and it is screw-threaded, as indicated at 110, the threaded portion passing through the section or part 45 of the brace arm 44. This screw is employed for raising or lowering the cutting motor. The turning of this screw shaft by the pawl and ratchet mechanism will not interfere with the cutting action of the cutter 91 as the amount to be cut or ground off of the propeller blade will be removed in most cases in less than one turn of the screw shaft whereupon the switch will be thrown off in the manner stated.

The post 2 has mounted thereon between the collars 6 and 62, a collar 111 which is slidable axially on the post as shown, and this collar has formed integrally therewith the bracket arm 112 to which is secured a cover plate 113. This plate forms a shield over the pitch head unit and the main driving motor 12 and protects these parts from falling metal which is cut off of the propeller blade. The plate is provided with an opening 114 through which the arbor 38 passes, so that the pitch head unit will be completely covered.

Where it is desired to grind or dress the surfaces of propeller blades which are longitudinally curved such as the blade 115 shown in Fig. 6, the straight guides 73 are replaced by guides which are longitudinally arcuate such as is indicated at 116 in Fig. 6. These guides are supported between the legs 71 and the plate 72 in the same manner as the straight guides 73. Due to the employment of the pivoted feed nut 94 mounted between the legs 93 of the cutter motor and to the fact that the gear box 74 is oscillatably supported between the arms 71 upon the trunnion pins 76, it will be readily seen that the motor 90 will be permitted to move in the desired arcuate path to enable the cutter wheel 91 to follow the contour of the blade. When the arcuate guides 116 are employed, the socket 92' of the inner forward leg 92 of the motor has secured therein an extension bar 92" which thus effectively lengthens this leg of the motor to which it is attached so that the stops 96 may be alternately engaged as the motor moves back and forth along the arcuate path prescribed by the bars 116 by which it is suspended.

Where blades of the spoon or hollow type are to be milled, a slight modification of the pitch head unit and of the arbor bracing means is employed as is shown in Fig. 7. In this figure, the numeral 49' designates the split collar corresponding with the collar 49 of Fig. 1, to which collar is rigidly connected the two-part extensible arm 44' corresponding to the arm 44 of Fig. 1. On the outer end of this arm is a vertical guide 42' corresponding to the guide 42.

The pitch head unit is here indicated generally by the numeral 26' which includes the pitch groove cylinder 27' which is rotatable in and extends through the guide sleeve 28' which is fixed and carries a pitch selector pin, not shown, corresponding with the pin 30 shown in Figs. 1 and 5. Within the cylinder 27' is a core body 117, which is detachably coupled with the cylinder by a pin 118 which is of similar construction to the pin 54 of Fig. 5 and is adapted for selective engagement in notches, not shown, in the core body. The core body has secured to the upper end thereof the leaf 119 of a hinge unit, the corresponding leaf of which is indicated by the numeral 120, and these hinge leaves are maintained in desired spaced relation by the screws 121 and 122. It will be readily apparent that the screw 121 limits, by reason of the position of the nut 123 thereon, the extent of separation of the hinge leaves while the screw 122 which works through a pivoted nut 124, functions to force the leaves apart.

The upper one of the hinge leaves 120 carries a divider head 125 which is of circular form like the head 36 shown in Fig. 5, and this divider head is rotatably mounted in an enclosing cylinder 126 which is secured to the leaf 120. The numeral 127 designates a selector pin corresponding with the pin 54 of Fig. 5 which engages in notches, not shown, in the body of the divider 125 so that the divider can be turned to various positions within the cylinder 126.

The divider head 125 has secured therein an end of the arbor 38'. This arbor is held perpendicularly to the hinge leaf 120 and is tapered like the arbor 38 to receive the propeller 39'. This propeller is of a type in which the blades 40' are of dished or spoon form. Therefore, it is necessary to provide the angle mechanism comprised in the hinge structure and the parts associated therewith so that when the pitch groove cylinder is made to rotate by the linkage 60 and collar 56, not here illustrated in Fig. 7, the blade as it is simultaneously turned and raised and lowered will be caused to move with respect to the cutting wheel 91 along the desired path, so that the wheel may follow the dished surface of the blade.

In order that the angle mechanism and the inclined arbor 38' may be firmly held in desired position, there is provided the coupling arrangement between the arbor and the arm 44' which is shown in Fig. 7. This coupling consists of the crossed arms 128 and 129 and a coupling or clamp 130 by which they are secured in crossed relation. The arm 128 is slidably engaged in the guide 42' and its lower portion is of semi-circular cross-section. The arm 129 has a split sleeve 131 at one end which receives the upper end of the arbor 38' and from its other end and through the major portion of its length, this arm is of semi-circular cross-section, as shown in Fig. 8.

The coupling clamp 130 between the arms consists of two plates, each of which is indicated by the numeral 132 and each of which is provided with the semi-circular diametrically extending channel 133, which receives the semi-circular portion of one arm. Since the flat faces of the semi-circular portions of the two arms are in opposed relation, it will be apparent that the open sides of the channels 133 of the clamp plates will also be opposed so that the plates proper can be brought into face to face abutting relation. These plates are held in such relation by bolts 134 which are passed through arcuate slots 135, which are concentrically formed in each plate and by this arrangement, the plates may be relatively turned on their axes to swing the arms 128 and 129 to any desired angular relation.

It will, of course, be understood that the maintenance of the motor 90 and the supporting guides therefor in the proper parallel relation with the propeller blade 40' is facilitated by the pivotal mounting of the arm 70 upon the bolt 66.

In the use of the present machine, if the working face of a propeller blade is finished to a true screw pitch it will only be necessary to use one groove of the pitch head unit 26 or a set of grooves which may be parallel in the same pitch. However if a freak pitch is to be formed or shaped, that is, if there is to be cut a propeller blade having one section of one pitch and another section or other sections at other pitches, then different grooves would be used for shaping the different pitch sections of the freak blade.

From the foregoing, it will be readily apparent that there has been set forth a propeller finishing or milling machine wherein propeller blades of various types may be readily milled or dressed and wherein the setting of the machine for operation upon blades or propellers of various pitches may be accomplished easily and quickly and without the necessity of interchanging gears. It will also be readily seen that with the machine of the type herein disclosed, after the necessary adjustments have been made and the machine started, further attention to its operation is unnecessary and that when the desired number of movements of the milling cutter have been made with respect to the propeller blade, the entire machine will be automatically stopped.

What is claimed is:

1. A propeller blade cutting and milling machine, comprising a propeller supporting arbor, means supporting the arbor to facilitate its turning on the axis of the propeller, a milling cutter supported for rectilinear movement along a path perpendicular to the arbor and longitudinally of a blade of a propeller supported thereon, rotatable means coupled with said arbor and supporting the same for turning the arbor and a propeller mounted thereon, means forming a part of the rotatable means to effect simultaneous turning and progression of a blade with respect to the milling cutter along a prescribed path corresponding to the pitch of the propeller, said last means including two coacting portions, one of which portions is stationary while the other portion moves cooperatively therewith and with the rotatable means for the accomplishment of the stated propeller movement, and a driving connection between said rotatable means and said milling cutter to effect the turning of the last means and the rectilinear movement of the milling cutter simultaneously.

2. A propeller blade cutting and milling machine, comprising a cylinder body having a plurality of obliquely directed grooves therein corresponding to various pitches of propeller blades, means for selective engagement in said grooves holding said cylinder for rotation on its long axis and simultaneous axial movement, means for effecting the rotational and axial movement of the cylinder, a propeller supporting arbor mounted upon and carried by said cylinder, and a milling cutter supported adjacent to the arbor for movement toward and away from the same and longitudinally of a propeller blade.

3. In a propeller cutting and milling machine including a milling cutter suported for back and forth movement along a prescribed path, a propeller supporting arbor, means securing said arbor with the axis thereof in a position with respect to said cutter to support a propeller blade for engagement throughout its length by said cutter in the said back and forth traveling movement thereof, and means for turning said arbor to move said propeller blade through two intersecting paths of movement running perpendicular to the line of movement of the cutter comprising a fixed sleeve body, a cylinder extending through said sleeve and having a groove formed obliquely therein, a pin member carried by the sleeve and engaging in said groove to support the cylinder in the sleeve for rotary and axial movement, means coupling the upper end of the cylinder with said arbor, and power means operatively coupled with the cylinder for effecting the oscillation of the same on its long axis.

4. A propeller blade cutting and milling machine, comprising an arbor upon which a propeller unit is mounted, means supporting the arbor comprising a fixed guide, a member on which the arbor is carried supported in the guide for turning movement and for movement on the turning axis thereof, cooperating inter-engaging elements between the guide and member for effecting advancement and retraction of the member at selective rates of speed when turning movement is given to the member for the movement of a propeller blade supported upon the arbor through a spiral path corresponding to the pitch of the blade, a power mechanism coupled with said member for actuating the same, a milling cutter, means supporting the milling cutter for back and forth movement lengthwise of the propeller blade, and an operative driving connection between said power mechanism and the milling cutter supporting means by which the movement of the propeller blade through the path corresponding to its pitch and the back and forth movement of the milling cutter are coordinated.

5. A propeller blade cutting and milling machine, comprising an arbor upon which a propeller unit is mounted, means for simultaneously turning said arbor and reciprocably moving the same for the movement of a propeller blade supported thereon through a spiral path corresponding to the pitch of the blade, a power mechanism coupled with said means for actuating the same, a milling cutter, means supporting the milling cutter for back and forth movement lengthwise of the propeller blade, an operative driving connection between said power mechanism and the milling cutter supporting means by which the movement of the propeller blade through the path corresponding to its pitch and the back and forth movement of the milling cutter are coordinated, a switch unit controlling the operation of said power mechanism, and means actuated as a result of the back and forth movement of the milling cutter for effecting the opening of the switch mechanism after the completion of a predetermined number of such back and forth movements of the cutter.

6. A propeller blade cutting and milling machine, comprising an arbor designed to support a propeller unit, means coupled with said arbor for effecting turning and reciprocating movement of the same for the back and forth movement of the blades of the propeller along a spiral path corresponding to the pitch of the propeller, said means comprising a fixed sleeve, a cylinder extending through the sleeve and adapted for axial and rotational movement therein, the cylinder having a guide having a direct relation to the pitch of the propeller, a supporting pin for the cylinder carried by said sleeve and engaging said guide, a driving motor, a link drive connection between said motor and said cylinder for effecting the oscillation of the cylinder on its axis, an arm supported with respect to the arbor to position above the propeller unit mounted on the arbor, a guide carried by the arm and extending substantially perpendicularly to the axis of the arbor, a milling cutter supporting an operating motor mounted upon said guide for longitudinal movement thereon and for movement lengthwise of a blade of the propeller, and an operative drive connection between said first motor and the supporting means for the second motor by which the reciprocable movement of the milling cutter longitudinally of a propeller blade is coordinated with the movement of such blade along the said spiral path corresponding to its pitch.

7. A propeller blade cutting and milling machine, comprising an arbor designed to support a propeller unit, means coupled with said arbor for effecting turning and reciprocating movement of the same for the back and forth movement of the blades of the propeller along a spiral path corresponding to the pitch of the propeller, said means comprising a fixed sleeve, a cylinder extending through the sleeve and adapted for axial and rotational movement therein, the cylinder having a guide having a direct relation to the pitch of the propeller, a supporting pin for the cylinder carried by said sleeve and engaging said guide, a driving motor, a link drive connection between said motor and said cylinder for effecting the oscillation of the cylinder on its axis, an arm supported with respect to the arbor to position above the propeller unit mounted on the arbor, a guide carried by the arm and extending substantially perpendicularly to the axis of the arbor, a milling cutter supporting an operating motor mounted upon said guide for longitudinal movement thereon and for movement lengthwise of a blade of the propeller, an operative drive connection between said first motor and the supporting means for the second motor by which the reciprocable movement of the milling cutter longitudinally of a propeller blade is coordinated with the movement of such blade along the said spiral path corresponding to its pitch, a control switch for governing the flow of driving current to said motors, and a step by step operated cut-off mechanism operated by the supporting means for the second-mentioned motor in its back and forth movement for effecting the opening of said switch upon the completion of a predetermined number of alternations of movement of the milling cutter actuating motor.

8. A propeller blade cutting and milling machine, comprising a standard, a sleeve body supported adjacent to and with its axis parallel with said standard, a cylinder body extending through said sleeve for rotational and axial movement therein, a power motor, a driving connection between said motor and said cylinder by which oscillation is imparted to the cylinder on its long axis, means operatively coupling the cylinder with the sleeve for effecting a predetermined degree of axial movement of the cylinder simultaneously with the turning thereof, an arbor supported upon the upper end of said cylinder and adapted to support a propeller unit, said axial and rotational movement of the cylinder under the control of the operative coupling between the cylinder and the sleeve imparting a spiral movement to the propeller supported upon the arbor corresponding to the pitch of the propeller, a bracing arm carried by said standard and operatively connected with the upper end of the arbor to maintain the same steady and permit the rotational and lengthwise movement thereof, a second arm carried by the standard, a milling cutter unit supported by the second arm for reciprocal movement along a path paralleling the length of a propeller blade, means supported by the second arm and operatively coupled with the milling cutter unit for effecting said reciprocal movement of the latter, and a power means operatively coupled with the last-mentioned means for driving the same.

9. A propeller blade cutting and milling machine, comprising a standard, a sleeve body supported adjacent to and with its axis parallel with said standard, a cylinder body extending through said sleeve for rotational and axial movement therein, a power motor, a driving connection between said motor and said cylinder by which oscillation is imparted to the cylinder on its long axis, means operatively coupling the cylinder with the sleeve for effecting a predetermined degree of axial movement of the cylinder simultaneously with the turning thereof, an arbor supported upon the upper end of said cylinder and adapted to support a propeller unit, said axial and rotational movement of the cylinder under the control of the operative coupling between the cylinder and the sleeve imparting a spiral movement to the propeller supported upon the arbor corresponding to the pitch of the propeller, a bracing arm carried by said standard and operatively connected with the upper end of the arbor to maintain the same steady and permit the rotational and lengthwise movement thereof, a second arm carried by the standard, a milling cutter unit supported by the second arm for reciprocal movement along a path paralleling the length of a propeller blade, a guide bar supported by the second arm and extending substantially perpendicularly to the arbor, a screw supported by the second arm and extending longitudinally of the guide bar, a milling cutter and operating motor therefor, a sliding connection between said milling cutter motor and the guide bar, an operative connection between a portion of the milling cutter motor and said screw, means for rotating said screw, and means for reversing the rotation of the screw upon movement of the milling cutter motor to either of two predetermined positions on said guide, the milling cutter in its movement on the guide moving longitudinally of a blade of the propeller unit on the arbor.

10. A propeller blade cutting and milling machine, comprising a standard, a sleeve body supported adjacent to and with its axis parallel with said standard, a cylinder body extending through said sleeve for rotational and axial movement therein, a power motor, a driving connection between said motor and said cylinder by which oscillation is imparted to the cylinder on its long axis, means operatively coupling the cylinder with the sleeve for effecting a predetermined degree of axial movement of the cylinder simultaneously with the turning thereof, an arbor supported upon the upper end of said cylinder and adapted to support a propeller unit, said axial and rotational movement of the cylinder under the control of the operative coupling between the cylinder and the sleeve imparting a spiral movement to the propeller supported upon the arbor corresponding to the pitch of the propeller, a bracing arm carried by said standard and operatively connected with the upper end of the arbor to maintain the same steady and permit the rotational and lengthwise movement thereof, a second arm carried by the standard, a milling cutter unit supported by the second arm for reciprocal movement along a path paralleling the length of a propeller blade, a guide bar supported by the second arm and extending substantially perpendicularly to the arbor, a screw supported by the second arm and extending longitudinally of the guide bar, a milling cutter and operating motor therefor, a sliding connection between said milling cutter motor and the guide bar, an operative connection between a portion of the milling cutter motor and said screw, means for rotating said screw, means for reversing the rotation of the screw upon movement of the milling cutter motor to either of two predetermined positions on said guide, the milling cutter in its movement on the guide moving longitudinally of a blade of the propeller unit on the arbor, said arbor being adjustable for support upon the cylinder from a vertical position to a position inclined from the vertical, and said second-mentioned arm being oscillatable upon the standard for the maintenance of the milling cutter motor guide substantially perpendicular to the axis of the arbor.

11. In a propeller cutting and milling machine, a propeller support for rotating the propeller on its axis through a predetermined arc and simultaneously axially moving the propeller a predetermined distance, a cutter unit supported for back and forth movement longitudinally of a blade of the propeller, mechanism for effecting movement of the support to impart the rotating and axial movement to the propeller, automatically operating means for moving said cutter in timed relation to the movements of the propeller, and means actuated by the cutter unit for automatically stopping movement of the cutter and of the propeller when the cutter has made a predetermined number of such back and forth movements.

12. In a propeller cutting and milling machine, a propeller supporting body supported for rotational and rectilinear movement on the axis of its rotation, a driving means connected with said body for imparting rotational movement thereto, said body having a camming surface extending obliquely to the rotational axis, a camming finger engaged with said surface to effect the desired rectilinear movement upon rotation of the body, said body when executing said rotational and rectilinear movement imparting a screw movement to a supported propeller conforming with the pitch thereof, a cutter arranged for operative engagement with a face of a blade of the propeller, and means for moving the cutter in a prescribed path over the face of the blade as the propeller is given said screw movement.

13. In a propeller cutting and milling machine, a propeller supporting body mounted for rotational movement and rectilinear movement along the axis of its rotation, a driving means connected with said body for imparting rotational movement thereto, said body having a plurality of camming surfaces extending obliquely with respect to said axis, said surfaces being at different oblique angles to the axis, a camming finger adapted for selective engagement with said surfaces to effect a desired rectilinear movement upon rotation of the body, said body when given the desired rotational and rectilinear movement imparting a screw-like movement to a supported propeller conforming to the pitch thereof, a cutter arranged for operative engagement with a face of a blade of the propeller, and means for moving the cutter over the blade face as the propeller is given the desired screw-like movement.

14. A propeller cutting and milling machine, comprising an elongated body supported for rotational and axial movement, means for supporting a propeller upon the body at one end thereof, a guide in which the body is supported for the rotational and axial movement, means for imparting rotational movement in the body to the guide, cooperating means between the body and the guide for effecting a prescribed axial movement to the body when the body is given rotational movement, the said rotational and axial movement of the body turning a propeller supported thereon through a spiral movement conforming to the pitch of the propeller, a rotary cutter supported for movement in a prescribed path across a face of a blade of the propeller, means for imparting back and forth movement to the rotary cutter in said path, the cutter moving means and the body rotating means being coupled for simultaneous operation, and automatically operated means for stopping the said simultaneous operation of the coupled means when the cutter has made a prescribed number of cutting movements.

15. A propeller cutting and milling machine, comprising an elongated body supported for rotational and axial movement, means for supporting a propeller upon the body at one end thereof, a guide in which the body is supported for the rotational and axial movement, means for imparting rotational movement in the body to the guide, cooperating means between the body and the guide for effecting a prescribed axial movement to the body when the body is given rotational movement, the said rotational and axial movement of the body turning a propeller supported thereon through a spiral movement conforming to the pitch of the propeller, a rotary cutter supported for movement in a prescribed path across a face of a blade of the propeller, means for imparting back and forth movement to the rotary cutter in said path, the cutter moving means and the body rotating means being coupled for simultaneous operation, and automatically operated means for stopping the said simultaneous operation of the coupled means when the cutter has made a prescribed number of cutting movements, the said means for supporting the propeller at an end of the body being rotatable independently of the body to effect the turning of a selected blade of the propeller into operative relation with the cutter.

16. A propeller blade cutting and milling machine, comprising a standard, a pillar member supported adjacent to said standard for movement relative thereto, a guide carried by the pillar, a cylindrical body extending through the guide for rotational and axial movement therein, means forming a cooperative camming connection between the cylindrical body and the guide for effecting a desired degree of axial movement of the body upon its rotation, power means connected with the body for effecting continuous oscillation of the same on its axis of rotation, an arbor secured to an end of the body for the support of a propeller unit, said arbor being movable upon and relative to the body for disposing a supported propeller in a desired predetermined position, means connecting the upper end of the standard with the arbor for maintaining the arbor steady with respect to the body, a supporting arm carried by the standard and including a screw member, guide means carried by and extending lengthwise of the arm, a motor cutter unit carried by and movable on the guide means, said arm and guide being disposed with respect to a blade of the propeller unit for the movement of the cutter longitudinally of the blade, said screw being operatively coupled with the motor cutter unit to effect such movement, and driving means for said screw.

17. In a propeller milling and cutting machine, a propeller supporting body, means for imparting movement to the propeller in a spiral manner corresponding to the pitch of the propeller, a motor cutter unit, a supporting arm for said unit including a guide with which said motor is slidably connected, the guide being so constructed and arranged that the cutter will be moved lengthwise of a blade of the propeller unit, a screw rotatably supported in substantially parallel relation to the arm and extending in the direction of movement of the cutter and having threaded connection with a portion of the motor, means for imparting rotary power to the screw including a transmission mechanism by which alternate rotation may be imparted to the screw, a shift rod operatively coupled with the transmission mechanism to effect rotation of the screw in either of two directions, and means carried by the shift rod and engaged by the motor unit at the extremities of its path of movement for effecting shifting of the transmission and reversal of the direction of rotation of the screw.

18. In a propeller milling and cutting machine, a propeller supporting body, means for imparting movement to the propeller in a spiral manner corresponding to the pitch of the propeller, a motor cutter unit, a supporting arm for said unit including a guide with which said motor is slidably connected, the guide being so constructed and arranged that the cutter will be moved lengthwise of a blade of the propeller unit, a screw rotatably supported in substantially parallel relation to the arm and extending in the direction of movement of the cutter and having threaded connection with a portion of the motor, means for imparting rotary power to the screw including a transmission mechanism by which alternate rotation may be imparted to the screw, a shift rod operatively coupled with the transmission mechanism to effect rotation of the screw in either of two directions, means carried by the shift rod and engaged by the motor unit at the extremities of its path of movement for effecting shifting of the transmission and reversal of the direction of rotation of the screw, a switch unit controlling the operation of the said means by which rotary power is imparted to the screw, a rotary finger arranged when moved to a predetermined position to actuate said switch unit to opened condition, a pawl and ratchet mechanism for effecting the turning of said finger from a predetermined position to switch opening position, and means for effecting the actuation of the pawl and ratchet mechanism by the motor cutter unit as the same reciprocates between the said extremities of its path of movement.

19. In a propeller milling and cutting machine, a propeller supporting body, means for imparting movement to the propeller in a spiral manner corresponding to the pitch of the propeller, a motor cutter unit, a supporting arm for said unit including a guide with which said motor is slidably connected, the guide being so constructed and arranged that the cutter will be moved lengthwise of a blade of the propeller unit, a screw rotatably supported in substantially parallel relation to the arm and extending in the direction of movement of the cutter and having threaded connection with a portion of the motor, means for imparting rotary power to the screw including a transmission mechanism by which alternate rotation may be imparted to the screw, a shift rod operatively coupled with the transmission mechanism to effect rotation of the screw in either of two directions, and means carried by the shift rod and engaged by the motor unit at the extremities of its path of movement for effecting shifting of the transmission and reversal of the direction of rotation of the screw, said supporting guide for the motor cutter unit being longitudinally arcuate to facilitate the cutter following a longitudinally curved blade and said screw being oscillatably mounted and having its threaded connection with the motor through the medium of a pivotally supported nut by which relative movement may take place between the motor and the screw transversely to the screw as the motor reciprocates longitudinally of the screw.

20. A propeller cutting and milling machine, comprising a cylindrical body, a guide for said body in which the body has rotational and axial movement, cooperating means between the body and the guide for effecting a prescribed degree of axial movement of the body upon rotation of the body, means for imparting oscillatory rotary motion to the body by which a rectilinear axial movement of the body is made effective through said means, a propeller unit supporting arbor, means coupling the arbor with an end of the cylindrical body which is so constructed and arranged that the arbor may be disposed at an angle to the axis of the body, a brace arm secured above the arbor, a pair of bracing bars disposed in crossed relation and having lengthwise movement transversely of one another and relative movement on an axis extending through the bars at the point of intersection thereof, one of said bars being adjustably secured to said arm and the other of the bars being adjustably secured to the arbor, a second arm having a fixed position with respect to the arbor and directed toward the same, a guide bar carried by the second arm, a motor cutter unit slidably supported upon the guide bar for movement longitudinally of a blade of the propeller unit, and means for effecting the back and forth movement of the motor cutter unit with respect to the said propeller blade simultaneously with the oscillatory axial movement of the propeller blade supporting body.

21. A propeller blade shaping machine, comprising an elongated body of circular cross section, means supporting the body for axial and rotational movement, means carried by an end of the body for supporting a propeller, co-acting relatively movable elements between the body and its support for effecting rotational and axial movement of the body and of the supported propeller corresponding to the pitch of the propeller, power means for imparting movement to the body, and a cutter supported for movement lengthwise of a blade of the propeller during such rotational and axial movement.

22. A propeller blade shaping machine of the character stated in claim 21 in which said propeller supporting means comprises a tapered arbor to engage in propeller hubs of different sizes, and said cutter also being movable axially of the arbor.

23. A propeller blade shaping machine comprising a guide, a cylindrical body supported in the guide for rotational and axial movement, a guide means carried by the cylinder and defining a path corresponding to the pitch of a propeller blade, an element carried by the guide and engaged with said guide means for compelling axial movement of the body when the body is turned on its long axis, means for turning the body on its axis, means for supporting a propeller on an end of the body to be turned thereby through a spiral path corresponding to its pitch, and a cutter supported for movement lengthwise of a blade of the propeller.

24. In a propeller blade shaping machine as set forth in claim 23 a driving mechanism for moving said cutter which includes a guide on which the cutter is slidably supported and a reversing gear, a shift rod supported in parallelism with the line of movement of the cutter and operatively coupled with the reversing gear, adjustable stops carried by the shift rod, and an arm member connected with and moved by the cutter in the space between said stops for alternately engaging the stops to effect alternate movement of the shift rod for effecting reversal of the cutter movement after the cutter has moved a predetermined distance.

25. A propeller blade shaping machine of the character stated in claim 23 in which said propeller supporting means comprises an arbor on which the propeller is placed, and a coupling between an end of the arbor and the said end of the cylindrical body which is so constructed and arranged that the arbor may be disposed co-axial with the cylindrical body or to extend obliquely to the axis of the cylindrical body.

26. In a propeller blade shaping machine as set forth in claim 23, a mechanism for effecting the lengthwise movement of the cutter with respect to the blade which comprises a guide for the cutter, a worm operatively coupled with the cutter and a reversing gear coupled with said worm, a shift rod disposed to extend lengthwise of the path of movement of the cutter and operatively coupled with the reversing gear for changing the direction of rotation of the worm, a pair of spaced stops adjustably secured to the shift rod, an arm coupled with said cutter and arranged to move between said stops for alternate engagement therewith, mechanism for stopping the rotation of said worm and reversing gear including a rotatably supported element which when moved to a predetermined position effects the operation of said last mechanism, and means for moving said element to said predetermined position, comprising a ratchet wheel carried by the element and a pair of pawls attached to said shift rod and operatively engaging the ratchet wheel to impart a predetermined degree of movement thereto with each shifting of the shift rod in either of its two directions of movement.

HAROLD I. JOHNSON.